United States Patent
Walker et al.

(10) Patent No.: US 12,437,633 B2
(45) Date of Patent: Oct. 7, 2025

(54) METHODS AND SYSTEMS FOR OPERATING VEHICLES TO REDUCE BUNCHING

(71) Applicant: Freeport-McMoRan Inc., Phoenix, AZ (US)

(72) Inventors: Mary Amelia Walker, Phoenix, AZ (US); Robert Catron, Phoenix, AZ (US); Nicholas Hickson, Phoenix, AZ (US)

(73) Assignee: Freeport-McMoRan, Inc., Phoenix, AZ (US)

( * ) Notice: Subject to any disclaimer, the term of this patent is extended or adjusted under 35 U.S.C. 154(b) by 259 days.

(21) Appl. No.: 17/891,285

(22) Filed: Aug. 19, 2022

(65) Prior Publication Data

US 2023/0058576 A1    Feb. 23, 2023

Related U.S. Application Data

(60) Provisional application No. 63/236,034, filed on Aug. 23, 2021.

(51) Int. Cl.
*G08G 1/01* (2006.01)

(52) U.S. Cl.
CPC ......... *G08G 1/0133* (2013.01); *G08G 1/0112* (2013.01); *G08G 1/0145* (2013.01)

(58) Field of Classification Search
CPC ............... G08G 1/0133; G08G 1/0112; G08G 1/0145; G05D 1/0293; G05D 1/0297
See application file for complete search history.

(56) References Cited

U.S. PATENT DOCUMENTS

| | | | |
|---|---|---|---|
| 6,484,078 B1 * | 11/2002 | Kageyama | G08G 1/20 701/25 |
| 8,676,466 B2 * | 3/2014 | Mudalige | G08G 1/163 701/32.7 |
| 9,046,371 B2 | 6/2015 | Casson et al. | |
| 9,256,227 B1 | 2/2016 | Wei et al. | |
| 9,633,560 B1 * | 4/2017 | Gao | G08G 1/07 |

(Continued)

OTHER PUBLICATIONS

"How to Set & Maintain a Safe Following Distance When Driving—The 3 Second Rule Saves Lives". Youtube, user Stan Cravens. Posted Oct. 5, 2020. URL: https://www.youtube.com/watch?v=ksxfBi7Z-Vk. (Year: 2020).*

International Search Report and Written Opinion, dated Jan. 4, 2023, for PCT/US2022/040940, 15 pages.

(Continued)

*Primary Examiner* — Donald J Wallace
*Assistant Examiner* — Henry R Hinton
(74) *Attorney, Agent, or Firm* — Fennemore Craig, P.C.

(57) ABSTRACT

Systems and methods of operating vehicles to reduce bunching of the vehicles when traveling on a roadway determine an intra arrival time for two consecutive vehicles traveling on the roadway; calculate a virtual spacing between the two consecutive vehicles based on the intra arrival time; determine a following distance threshold; compare the virtual spacing between the two consecutive vehicles with the following distance threshold; determine that the two consecutive vehicles are in a bunched condition when the virtual spacing between the two consecutive vehicles is less than the following distance threshold; and control at least one of the two consecutive vehicles until the vehicles are no longer in the bunched condition.

32 Claims, 5 Drawing Sheets

(56) References Cited

U.S. PATENT DOCUMENTS

| | | | | |
|---|---|---|---|---|
| 11,161,510 | B2* | 11/2021 | Doering | B60W 20/00 |
| 11,926,322 | B2* | 3/2024 | Gupta | B60W 50/0098 |
| 2011/0248868 | A1* | 10/2011 | Free | G08G 1/0104 |
| | | | | 340/907 |
| 2014/0297182 | A1* | 10/2014 | Casson | G05D 1/0217 |
| | | | | 701/537 |
| 2014/0343835 | A1* | 11/2014 | Cooper | B61L 23/00 |
| | | | | 701/300 |
| 2015/0291162 | A1* | 10/2015 | van Nunen | G08G 1/166 |
| | | | | 702/158 |
| 2016/0009279 | A1 | 1/2016 | Jimaa et al. | |
| 2018/0267559 | A1 | 9/2018 | Switkes et al. | |
| 2018/0342156 | A1* | 11/2018 | Martin | G08G 1/052 |

OTHER PUBLICATIONS

Australian Examination Report for AU application No. 2022332888, dated Jul. 23, 2024, 4 pages.
EP Search Report for 22861923.5, dated Oct. 31, 2024, 10 pages.
Australian Examination Report for AU application No. 2022332888, dated Dec. 13, 2024, 4 pages.
Australian Notice of Acceptance for Application No. 2022332888, dated Apr. 4, 2025, 4 pages.
Chilean Opposition against 00468-2024, English Translation is on the first 7 pages, original opposition in Spanish is on the remaining 43 pages.
Canadian Examiner's Requisition for Application No. 3,221,369, dated Jan. 10, 2025, 4 pages.
EP Examination Report for 22861923.5, dated May 21, 2025, 7 pages.

* cited by examiner

METHODS AND SYSTEMS FOR OPERATING VEHICLES TO REDUCE BUNCHING

CROSS-REFERENCE TO RELATED APPLICATION

This application claims the benefit of U.S. Provisional Patent Application No. 63/236,034, filed on Aug. 23, 2021, which is hereby incorporated herein by reference for all that it discloses.

TECHNICAL FIELD

The present invention relates to vehicle operations in general and more particularly to methods and systems for operating vehicles traveling consecutively on roadways.

BACKGROUND

Mining operations typically involve the delivery of large amounts of earthen materials, such as excavated ore, to various types of material processing systems to recover metals or other valuable minerals. Such further processing may involve one or more comminution or size-reduction steps to reduce the size of the excavated ore from a relatively coarse size to a finer size suitable for subsequent processing. Thereafter, the size-reduced ore may be subjected to any of a wide range of processes to separate the commercially valuable minerals from the waste material or gangue.

In a typical open-pit mining operation, the ore to be mined is periodically fractured (e.g., by blasting). Large shovels are then used to load the fractured ore into haul trucks. The haul trucks carry the excavated ore to various other locations throughout the mine for further comminution and/or processing. Such other locations may include one or more ore crushers, grinders, stockpiles, and waste dumps, just to name a few. Open-pit mining operations are conducted on a large scale and a given open pit mine may involve the use of a large number of shovels, haul trucks, and processing systems in order to process the large volumes of excavated ore involved.

The overall efficiency of the mining operation is based in part on the efficiency of the equipment used to deliver the excavated ore to the various locations for further processing.

SUMMARY OF THE INVENTION

One embodiment of a method of operating vehicles traveling on a roadway may involve: Determining an intra arrival time for two consecutive vehicles traveling on the roadway; calculating a virtual spacing between the two consecutive vehicles based on the intra arrival time; determining a following distance threshold; comparing the virtual spacing between the two consecutive vehicles with the following distance threshold; determining that the two consecutive vehicles are in a bunched condition when the virtual spacing between the two consecutive vehicles is less than the following distance threshold; and applying at least one vehicle control to at least one of the two consecutive vehicles until the two consecutive vehicles are no longer in the bunched condition.

Also disclosed is a computer-implemented method of operating a plurality of vehicles traveling on a roadway that includes: Determining, using a computer, an intra arrival time for two consecutive vehicles traveling on the roadway, the intra arrival time being based on respective times when the two consecutive vehicles pass a defined location on the roadway; calculating, with the computer, a virtual spacing between the two consecutive vehicles based on the intra arrival time; determining, with the computer, a following distance threshold; comparing, with the computer, the virtual spacing between the two consecutive vehicles with the following distance threshold; determining, with the computer, that the two consecutive vehicles are in a bunched condition when the virtual spacing between the two consecutive vehicles is less than the following distance threshold; and presenting, using the computer, user-discernable data relating to whether the two consecutive vehicles are in the bunched condition.

A system for operating vehicles traveling on a roadway may include a display system and a database. A processing system operatively associated with the display system, the database and the director system is configured to: Determine an intra arrival time for two consecutive vehicles traveling on the roadway; calculate a virtual spacing between the two consecutive vehicles based on the intra arrival time; determine a following distance threshold; compare the virtual spacing between the two consecutive vehicles with the following distance threshold; and determine that the two consecutive vehicles are in the bunched condition when the virtual spacing between the two consecutive vehicles is less than the following distance threshold. A director system operatively connected to the processing system applies at least one vehicle control to at least one of the two consecutive vehicles until the two consecutive vehicles are no longer in the bunched condition.

Also disclosed is a non-transitory computer-readable storage medium having computer-executable instructions embodied thereon that, when executed by at least one computer processor cause the computer processor to: Determine an intra arrival time for two consecutive vehicles traveling on a roadway; calculate a virtual spacing between the two consecutive vehicles based on the intra arrival time; determine a following distance threshold; compare the virtual spacing between the two consecutive vehicles with the following distance threshold; determine that the two consecutive vehicles are in a bunched condition when the virtual spacing between the two consecutive vehicles is less than the following distance threshold; and present data relating to whether the two consecutive vehicles are in the bunched condition in a user-discernable format.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
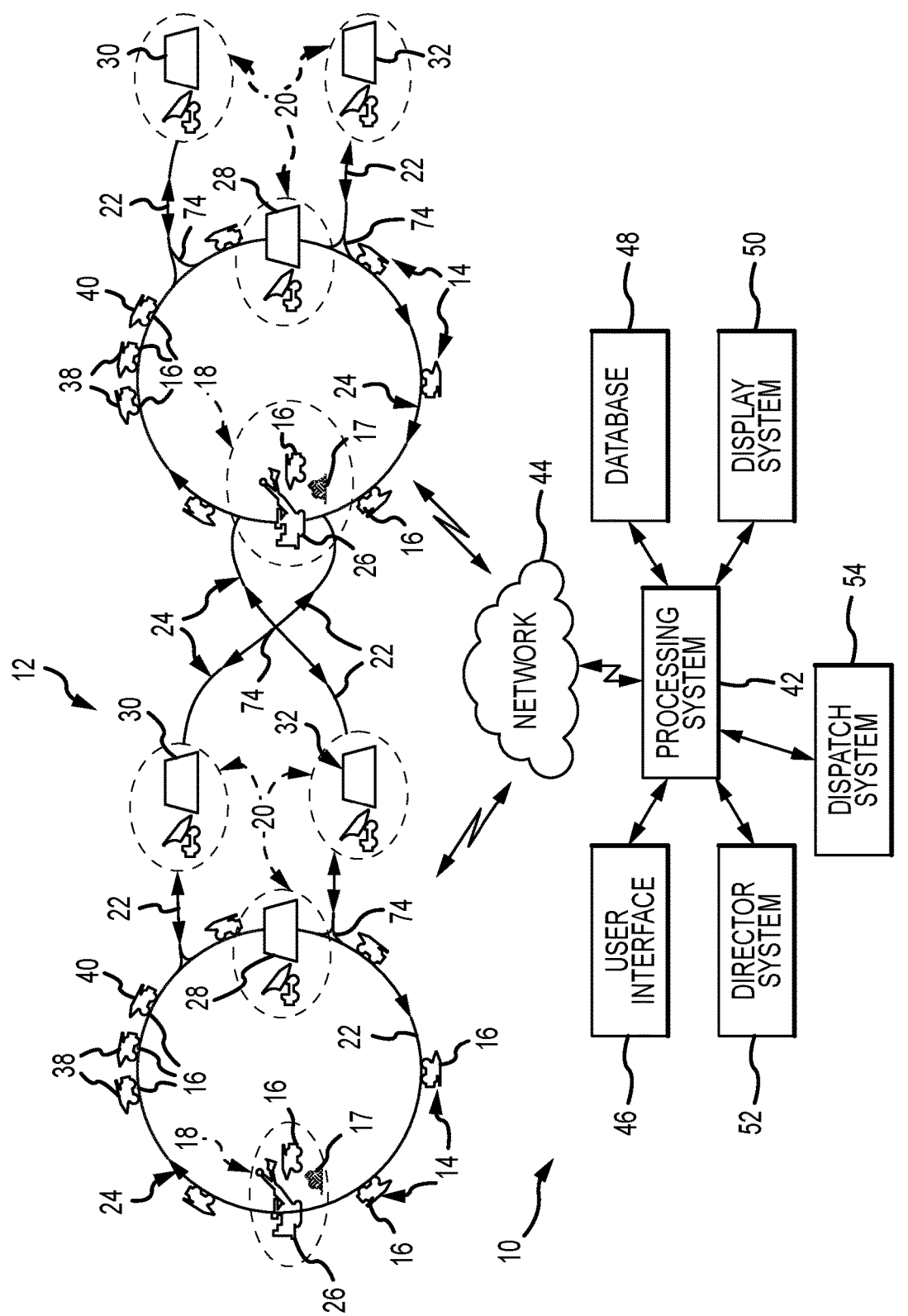
FIG. 1 is a schematic representation of one embodiment of a system for operating vehicles to reduce bunching.

One embodiment of a system 10 for operating vehicles to reduce bunching is illustrated in FIG. 1 as it could be used in an open-pit mining operation 12. Open pit mining operation 12 may include a plurality of vehicles 14, such as haul trucks 16. Haul trucks 16 may be configured to carry excavated material from one or more loading areas 18 to one or more dumping areas 20 via one or more haul roads 22. Taken together, haul roads 22 comprise a mine road network 24. Each loading area 18 may include one or more shovels or loaders 26 for loading excavated material into haul trucks 16. Some dumping areas 20 may include one or more ore crushers 28 for crushing or comminuting excavated material from the haul trucks 16. Other dumping areas 20 may simply include areas for receiving the excavated material, such as, for example, one or more stockpiles 30 or other extraction processes 32.

In a typical operational scenario, excavated material is loaded into the haul trucks 16 by shovel or loader 26. Once loaded, the haul trucks 16 carry the excavated material to one of the dumping areas 20. At the dumping area 20, the haul trucks 16 dump or discharge the excavated material for further processing. The now empty haul trucks 16 may then return to one of the loading areas 18 to receive additional amounts of excavated material in a process referred to herein as a 'cycle.'

Figure 2:
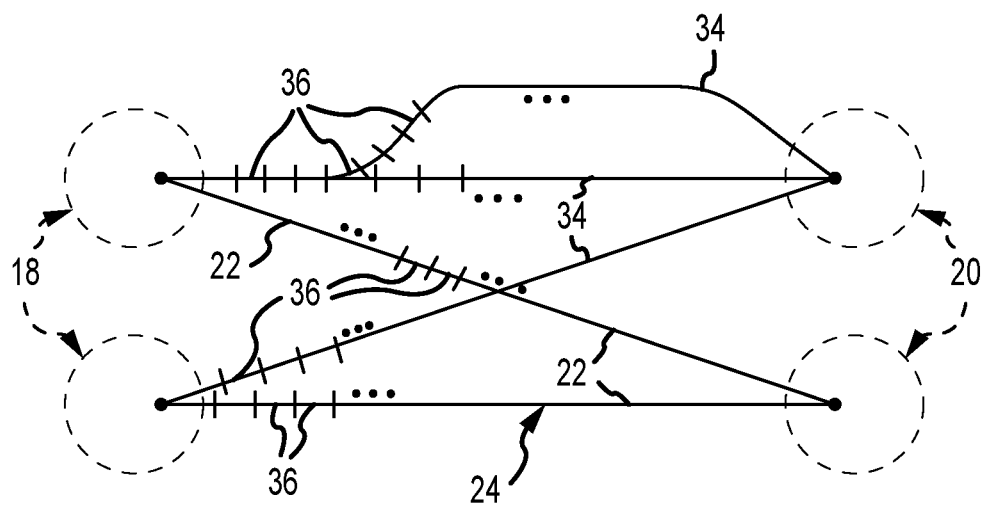
FIG. 2 is a simplified schematic representation of a portion of a haul road network illustrating various routes that may be taken vehicles traveling between various locations.

With reference now to FIG. 2, in many instances, the haul roads 22 comprising road network 24 allow the haul trucks 16 to follow one or more routes or pathways 34 between various locations, such as between one or more of the loading areas 18 and one or more of the dumping areas 20. A route or pathway 34 may be defined by a particular sequence of road segments 36.

Most mining operations, such as open-pit mine 12, involve a large number of haul trucks 16 that cycle between the various loading areas 18 and dumping areas 20, as depicted in FIG. 1. It is often the case that, during the course of a particular cycle, the various vehicles 14, e.g., haul trucks 16, will become 'bunched' together during travel. Such bunching can occur at any point in the cycle, e.g., when the haul trucks 16 are traveling from a loading area 18 to a dumping area 20 or during the return trip. While the determination of whether the vehicles 14 (e.g., haul trucks 16) are in a bunched condition is based on the specific factors and methodologies disclosed herein, vehicles 14 generally may be thought of as traveling in a bunched condition when the speed of one or more following vehicles 38 in a sequence of traveling vehicles 14 is limited by the speed of a leading vehicle 40. If vehicles 14 are determined to be in a bunched condition, as determined by the methods, systems, and instrumentalities described herein, aspects of the invention may then apply one or more vehicle controls to one or more of the vehicles 14 to reduce or eliminate the bunched condition.

More specifically, and in the particular embodiments shown and described herein, system 10 may include a processing system 42 that is operatively connected to the various systems and devices shown and described herein, either directly or via one or more networks 44. For example, in some embodiments, each haul truck 16 may be provided with one or more sensors (not shown) that are operatively associated with the various systems and devices of the haul truck 16. The sensors produce output signals and/or data that are related to the various associated systems and devices in a manner that will be described in further detail herein. The output signals and/or data from the sensors may be used by the methods, systems, and instrumentalities disclosed herein to operate the vehicles 14 to reduce or eliminate vehicle bunching.

Processing system 42 also may be operatively connected to one or more user interface systems 46, databases 48, display systems 50, director systems 52, and dispatch systems 54. User interface system(s) 46 may be configured to allow one or more users or system operators (not shown) to interface with and control certain aspects of processing system 42. Database(s) 48 may comprise a memory system (not separately shown) and be used to store information and data required by the processing system 42 in order to perform the various functions and method steps shown and described herein. Display system(s) 50 may be used to provide a visual depiction or display of information and data relating to the operation of the system 10 and whether the haul trucks 16 are traveling in a bunched condition. Of course, other types of information and data may also be displayed on display system 50.

Processing system 42 also may be operatively connected to a director system 52. Director system 52 is responsive to information and data produced by the processing system 42 and may be used to apply one or more vehicle controls to one or more of the haul trucks 16 to reduce or eliminate the bunched condition. Applied vehicle controls may include, but are not limited to, adjusting the speed of at least one of the two consecutive vehicles (e.g., either the leading vehicle 40 or one or more of the following vehicles 38) until the vehicles 14 are no longer traveling in the bunched condition. Other applied vehicle controls may include changing the travel routes 34, i.e., sequence of road segments 36 (FIG. 2), to the planned destination, e.g., the loading area 18 or dumping area 20. Still other applied vehicle controls may include assigning a new destination to the vehicle(s) 14.

In some embodiments, director system 52 may interface with a driver information module (not shown) associated with each haul truck 16 to instruct or command the driver to implement or apply the vehicle control(s) to minimize or eliminate the bunched condition. In other embodiments, director system 52 may also interface with mine dispatch system 54, either directly or via processing system 42. In such embodiments, director system 52 may, via the mine dispatch system 54, apply the vehicle control(s), e.g., to direct (or re-direct) one or more of the haul trucks 16 to follow one or more alternative routes or pathways 34 to reduce or eliminate the bunched condition. Director system 52, e.g., via the dispatch system 54, may also assign or re-assign a destination (e.g., a particular loading area 18 or dumping area 20) for one or more of the haul trucks 16 in order to minimize or eliminate the bunched condition.

Figure 4:
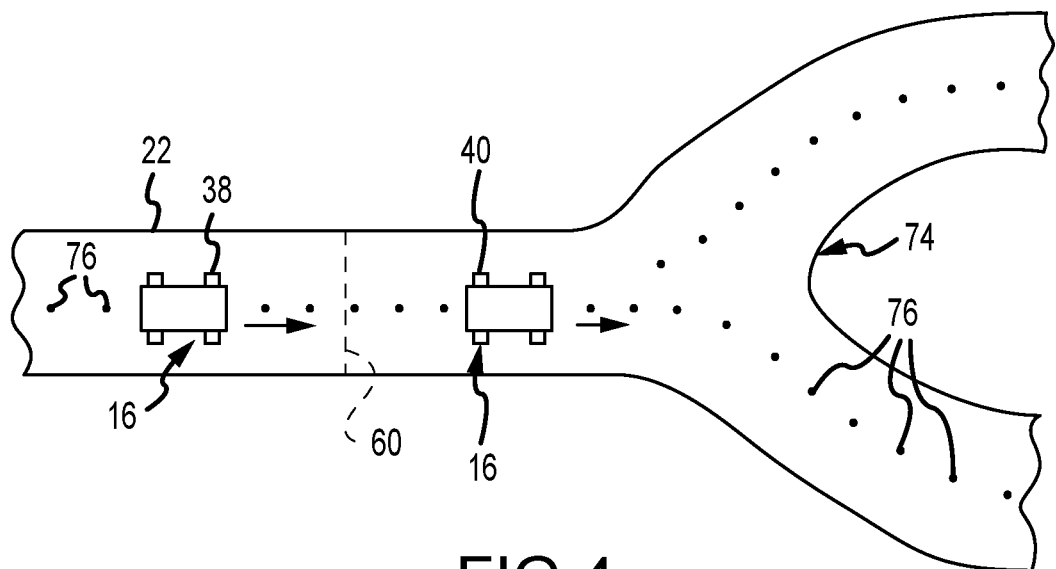
FIG. 4 is a pictorial diagram of a portion of a haul road showing exemplary locations of a leading vehicle, a following vehicle, and a plurality of snap points.
Figure 3:
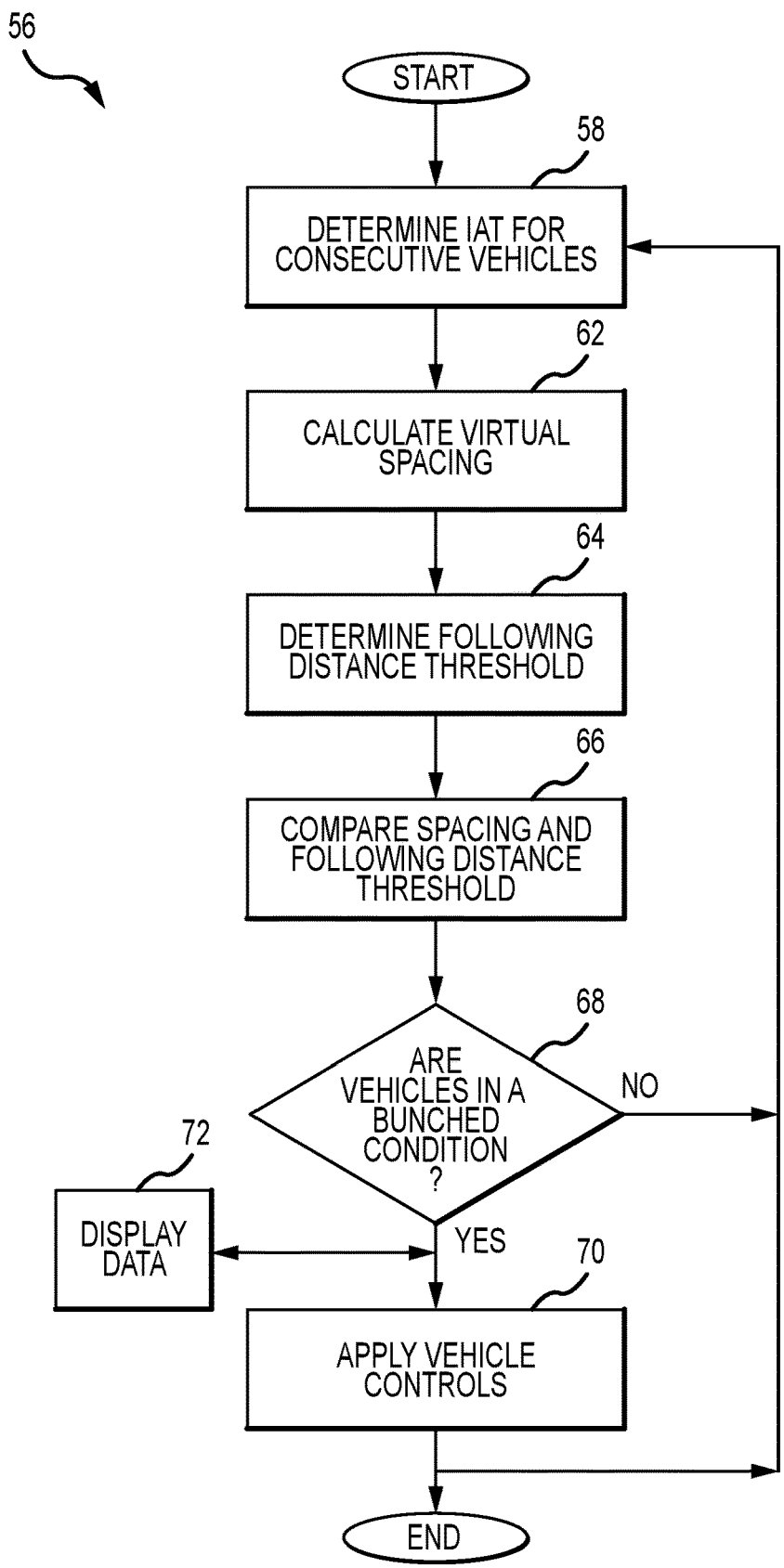
FIG. 3 is a flow chart representation of one embodiment of a method of operating vehicles to reduce bunching.

With reference now primarily to FIGS. 3 and 4, processing system 42 may be configured or programmed to operate in accordance with a method 56 to determine whether the vehicles 14 are traveling in a bunched condition. If so, the systems, methods, and instrumentalities described herein may apply one or more vehicle controls to one or more of the vehicles 14 to reduce or eliminate the bunched condition. A first step 58 of method 56 involves determining an intra-arrival time or 'IAT' for two consecutive haul trucks 16 traveling in the same direction on haul road 22 (FIG. 4). The intra-arrival time or IAT is the difference in time for the two consecutive haul trucks 16, e.g., a leading truck 40 and a following truck 38, to cross or pass a given defined point or location 60 on haul road 22.

A next step 62 of method 56 calculates a virtual spacing between the two consecutive haul trucks 16 traveling on haul road 22. The virtual spacing is based on the IAT and a haul truck speed. In one embodiment, the virtual spacing may be equal to the product of the IAT and the haul truck speed. The haul truck speed may be the velocity or speed of the first or leading haul truck 40 at the defined location 60, the velocity or speed of the second or following haul truck 38 at the defined location 60, or some combination thereof, such as the average of the two speeds. The speeds of the haul trucks 16 at the defined location 60 may be obtained from speed sensors (not shown) operatively associated with the various haul trucks 16.

Step 64 of method 56 determines a following distance threshold. In one embodiment, step 64 sets the following distance threshold to be equal to the greater of a safe following distance and a minimum following distance. In some embodiments, the safe following distance is the distance required for a particular haul truck 16 to come to a complete stop for a given speed, road grade, and payload status. The minimum following distance may be the minimum distance that truck operators (not shown) are trained to maintain between themselves and the haul truck 16 in front of them (e.g., leading haul truck 40). As will be explained in further detail herein, the minimum following distance may be different depending on whether the haul road 22 is in a wet condition or a dry condition.

Step 66 includes comparing the virtual spacing (i.e., from step 62) and the following distance threshold (i.e., from step 64). Step 68 determines that the two consecutive vehicles 14 (i.e., leading haul truck 40 and following haul truck 38) are in the bunched condition when the virtual spacing is less than the following distance threshold. If the leading and following haul trucks 40 and 38 are in the bunched condition, method 56 may then proceed to step 70. As will be described in much greater detail herein, step 70 applies one or more vehicle controls to either or both of the leading and following haul trucks 40 and 38 to reduce or eliminate the bunched condition.

The applied vehicle controls may involve adjusting the speed of at least one of the two consecutive vehicles (e.g., either the leading vehicle 40 or one or more of the following vehicles 38) until the vehicles 14 are no longer traveling in the bunched condition. Other applied vehicle controls may include changing the routes 34 or even the assigned destinations (e.g., the particular loading areas 18 or dumping areas 20) of the vehicles 14. The applied vehicle controls may be implemented via the director system 52 and/or dispatch system 54.

In some embodiments, method 56 may also comprise step 72 in which the processing system 42 presents on display system 50 information and data relating to whether the vehicles 14, e.g., haul trucks 16 are in the bunched condition. In one embodiment, the display system 50 may comprise a 'heat map', such as heat maps 78 and 80 illustrated in FIGS. 5 and 6, that indicates whether the vehicles 14 are in a bunched condition and the corresponding locations along the haul road 22.

A significant advantage of the systems, methods, and instrumentalities disclosed herein is that they may be used to determine when vehicles in a fleet of vehicles (e.g., haul trucks 16) are traveling in a bunched condition. If they are, then the systems, methods, and instrumentalities disclosed herein apply vehicle controls to reduce or eliminate the bunched condition. The methods, systems, and instrumentalities described herein may be used with either empty or loaded haul trucks (or even trucks with intermediate payloads), thereby allowing mine operators or managers to more efficiently manage the fleet of haul trucks and improve the overall efficiency of the mining operation. The methods, systems, and instrumentalities disclosed herein therefore represent an improvement in the technology of material transport and haulage systems, as well as the operation thereof.

Still other advantages are associated with the systems, methods, and instrumentalities disclosed herein. For example, we have discovered that the concept of a 'virtual spacing' provides for a much more accurate and reliable determination of whether the vehicles are operating in a bunched condition than would otherwise be the case, e.g., if the determination were made based on a simple measurement of the spacing between vehicles 14 at a particular moment in time.

Having briefly described certain exemplary embodiments of the systems, methods, and instrumentalities associated with the present invention, as well as some of their more significant features and advantages, various embodiments and alternative configurations of the systems, methods, and instrumentalities will now be described in detail. However, before proceeding the description, it should be noted that while the various embodiments are shown and described herein as they could be used in an open-pit mining operation to operate vehicles to reduce or eliminate vehicle bunching, the present invention is not limited to use in conjunction with mining applications. To the contrary, the present invention could be used in any of a wide range of applications, such as quarrying operations, logging operations, and others, that involve the movement of a plurality of vehicles along roadways that are prone to bunching, as would become apparent to persons having ordinary skill in the art after having become familiar with the teachings provided herein. Consequently, the present invention should not be regarded as limited to use in any particular type of application, environment, or equipment.

Referring back now primarily to FIG. 1, one embodiment of a system 10 for operating vehicles traveling on a roadway is shown and described herein as it could be used in conjunction with open pit mining operation 12. As mentioned, the open-pit mining operation 12 may comprise a plurality of vehicles 14, such as haul trucks 16, that are configured to carry excavated material from one or more loading areas 18 to one or more dumping areas 20 via haul roads 22.

As briefly mentioned above, excavated material may be loaded into haul trucks 16 at one of the loading areas 18 by a shovel or loader 26. Once loaded, the haul trucks 16 carry the excavated material to one of the dumping areas 20. At the dumping area 20, the haul trucks 16 dump or discharge the excavated material for further processing. The now empty haul trucks 16 may then return to one of the loading area 18 to receive additional amounts of excavated material. In a typical open-pit mining operation 12, the haul roads 20 comprising road network 24 may include one or more branches or intersections 74 (illustrated schematically in FIGS. 1 and 2 and pictorially in FIG. 4). Therefore, there may be one or more routes or pathways 34 (i.e., a defined sequence of haul road segments 36) between the various loading areas 18 and dumping areas 20, as best seen in FIG. 2.

Each vehicle 14, e.g., haul truck 16, may be provided with a plurality of sensors (not shown) that are operatively associated with various systems and devices of the haul truck 16. The sensors produce output signals and/or data that are related to the various associated systems and devices. More specifically, and in the particular embodiments shown and described herein, the various sensors may comprise a state sensor (not shown) for sensing, directly or indirectly, the payload state (e.g., loaded or empty) of the haul truck 16. In some embodiments, the state sensor may comprise a payload sensor (also not separately shown) mounted to the haul truck 16 and operatively associated with the dump bed of the haul truck 16. The output signals and/or data from the payload sensor may be related to the payload of the haul truck 16. The payload state of the haul truck 16 (e.g., loaded, empty, or intermediate) may then be directly determined from the signals and/or data produced by the payload sensor.

In other embodiments, the state sensor may comprise a position sensor (not separately shown) operatively associated with the haul truck 16. Output signals and/or data from the position sensor may be related to the position of the haul truck 16 within the mining environment 12. The payload state of the haul truck 16 may then be indirectly determined from the signals and/or data produced by the position sensor in accordance with the descriptions provided herein. For example, if a haul truck 16 is on a particular route 34 (FIG. 2) between a particular loading area 18 and a particular dumping area 20 (as may be the case for one-way road travel), then the payload state of the haul truck 16 may be indirectly determined to be in a loaded state. Similarly, if a haul truck 16 is on a particular route 34 between a particular dumping area 20 and a particular loading area 18 (again, as may be the case for one-way road travel), then the payload state of the haul truck 16 may be indirectly determined to be in an empty or unloaded state.

The sensors provided on each haul truck 16 may also include a speed sensor (also not separately shown) for sensing the speed of the haul truck 16. The output signals and/or data from the speed sensor may be related to the speed of the haul truck 16.

The various sensors may comprise all or a portion of a vehicle information management system (VIMS) and associated vehicle data network or networks (not separately shown) that may be provided on each haul truck 16. Together, such systems provide data sensing and reporting functionalities to facilitate the monitoring of the various haul truck components, states, and systems, as described herein. By way of example, such vehicle data networks may include, but are not limited to, Local Interconnect Networks ("LIN," e.g., configured in accordance with ISO 1941 and ISO 17987); Controller Area Networks ("CAN," e.g., configured in accordance with ISO 11898); and "FlexRay" (e.g., configured in accordance with ISO 17458). A haul truck 16 may be provided with more than one vehicle network.

It should be noted that sensors suitable for monitoring the various components, systems, and states of each haul truck 16 are well-known in the art and are commonly provided as OEM equipment on a wide range of haul trucks 16. Therefore, the particular sensors that may be utilized in conjunction with the present invention will not be described in further detail herein.

As briefly mentioned earlier, in some embodiments the sensors provided on each haul truck 16 may comprise a position or location sensor for sensing the position or location of the haul truck 16 as it operates within the mining environment 12. Such position sensors may comprise satellite-based position sensors that obtain position data from a constellation of satellites, such as those associated with the Global Positioning System (GPS), although other satellite-based position sensors are known and could be used instead. Alternatively, the position data may be obtained from other types of position sensors, such as from inertial sensing systems or from ground-based radio navigation systems. Consequently, the present invention should not be regarded as limited to any particular type of position sensors.

The various sensors of each vehicle 14 (e.g., haul truck 16) may be operatively connected to processing system 42 via network system 44. Network system 44 may comprise one or more wireless networks, wired networks, or combinations thereof, in order to facilitate the transfer of information and data from the various sensors provided on vehicles 14 to processing system 42. By way of example, in one embodiment, network system 44 may comprise a wireless network component (not separately shown) provided at the mining operation 12. Such a wireless network component may comprise a first link of network system 44 and may be used to capture and relay signals and/or data from the sensing systems provided on haul trucks 16 to a local area network infrastructure (also not separately shown) provided at the mining operation 12. Thereafter, another wide area network system (not shown) may be used transfer and/or relay the signals and/or data to a centralized network infrastructure (also not shown) which may be operatively associated with processing system 42. Of course, other variations and configurations of network system 44 are possible, as would become apparent to persons having ordinary skill in the art after having become familiar with the teachings provided herein. Therefore, the network system 44 shown and described herein should not be regarded as limited to any particular components, types, architectures, or configurations.

Processing system 42 may comprise one or more general purpose programmable computers of the type that are well-known in the art or that may be available in the future, as would become apparent to persons having ordinary skill in the art after having become familiar with the teachings provided herein. Consequently, the particular processing system 42 that may be used in conjunction with the various embodiments will not be described in further detail herein.

Processing system 42 may be programmed to operate in accordance with the methods described herein. The methods may be embodied in various software packages or modules provided on non-transitory computer-readable storage media accessible by processing system 42. The various software packages or modules may be provided with computer-executable instructions that, when performed by processing system 42, cause processing system 42 to process information and data in accordance with the teachings provided herein.

User interface system 46 may comprise one or more data input systems, such as keyboards, pointers, or touch screen displays (not shown) that are now known in the art or that may be developed in the future that would allow one or more users to interface with (i.e., provide data and commands to) system 10. User interface system 46 may also comprise one or more display systems (also not shown) to allow processing system 42 to provide information and data in user-discernible form. However, because user interface systems and associated data input and display systems are well-known in the art and could be readily provided by persons having ordinary skill in the art after having become familiar with the teachings provided herein, the particular user interface system 46 that may be used in the various embodiments will not be described in further detail herein.

Database 48 may comprise any of a wide range of memory systems (not separately shown) that are now known in the art or that may be developed in the future that are or would be suitable for storing information and data required by processing system 42 or other components of system 10. However, because memory systems suitable for use as database 48 are well-known in the art and could be readily provided by persons having ordinary skill in the art after having become familiar with the teachings provided herein, the particular memory system that may be used for database 48 will not be described in further detail herein.

Display system 50 may be used to provide a visual depiction or display of information and data relating to the operation of the system 10 and whether the haul trucks 16 are in a bunched condition. Other types of information and data may also be displayed on display system 50.

Figure 5:
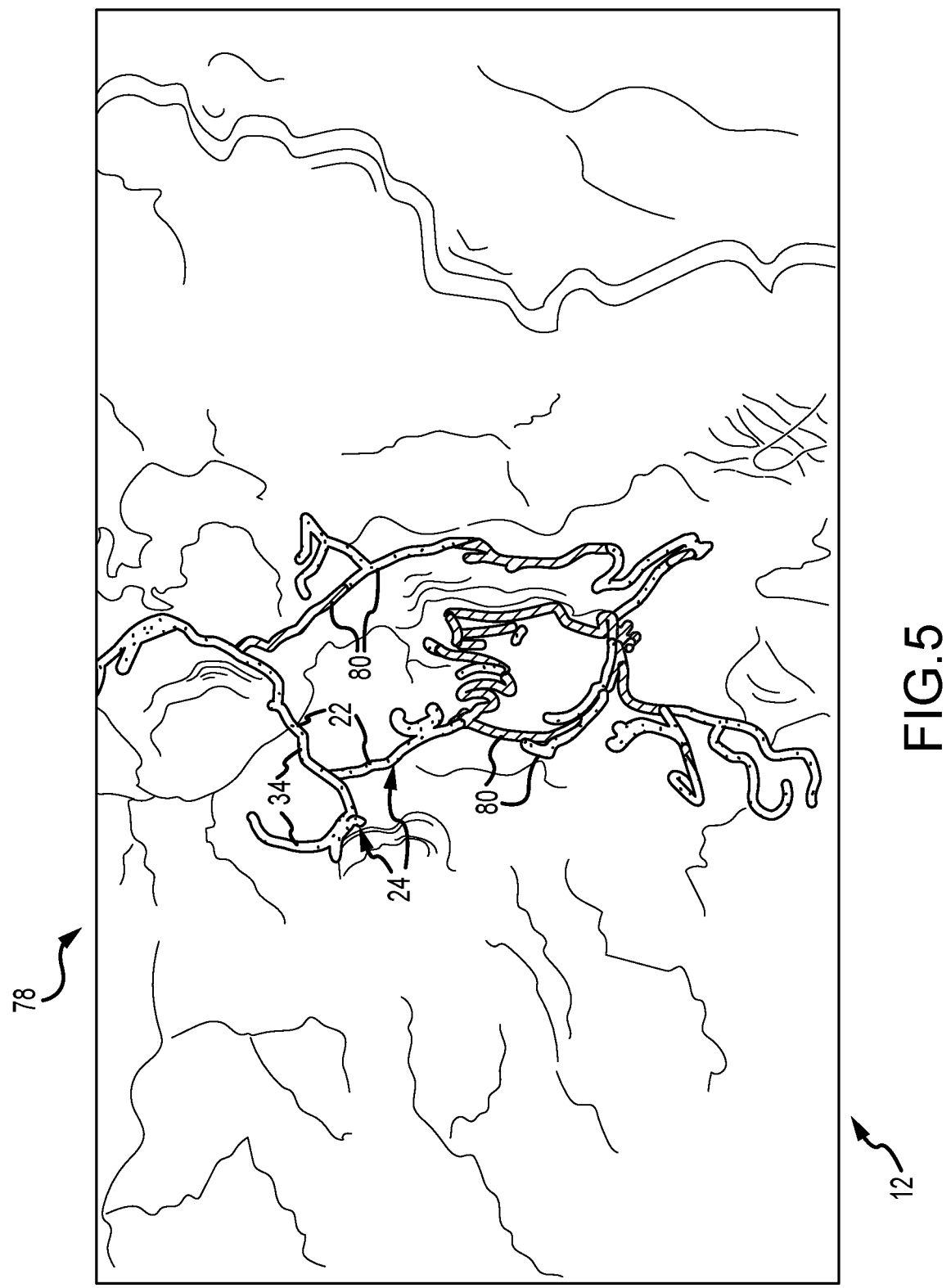
FIG. 5 depicts a heat map that may be displayed on display system showing bunching of vehicles traveling in the unloaded or empty payload state.

For example, and with reference now to FIG. 5, display system 50 may display or depict a 'heat map' 78 for haul trucks 16 (not shown in FIG. 5) traveling in the empty payload state. Heat map 78 may comprise a pictorial or aerial view (e.g., such as a satellite image) of the mining operation 12 and associated mine road network 24. The heat map 78 may comprise various segments 80 overlain on the road network 24 that provide a visual indication of the bunching conditions detected along various routes 34 of haul roads 22. For example, areas where significant bunching was detected may be depicted in a color red, whereas areas with less severe or only occasional bunching may be depicted in a color yellow. Areas where little or no bunching was detected may be depicted in a color green. Alternatively, indicia other than color, such as hashing, may be used to provide an indication of the existence and/or severity of detected bunching conditions.

Figure 6:
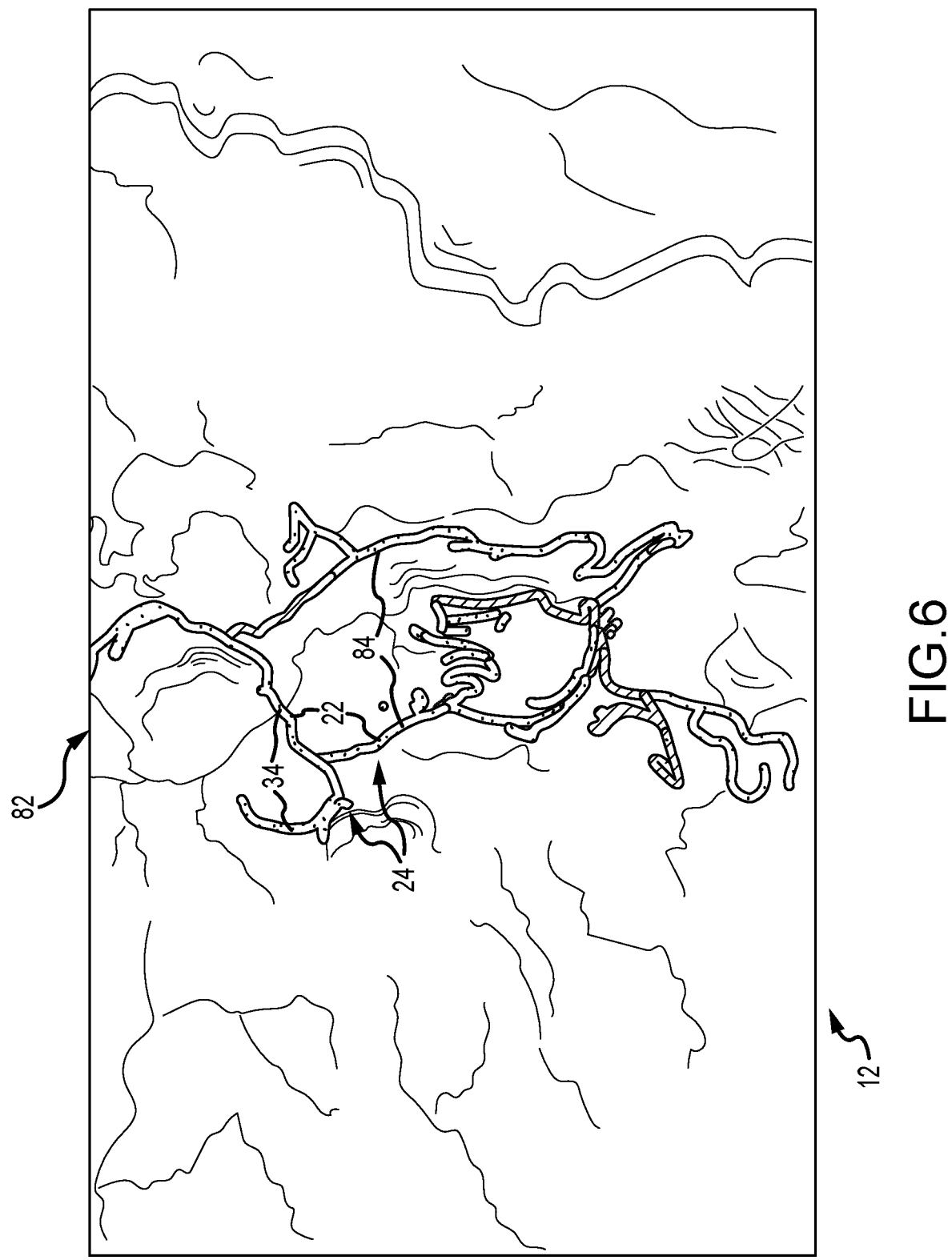
FIG. 6 depicts a heat map that may be displayed on display system showing bunching of vehicles traveling in the loaded payload state.

In some embodiments, display system 50 may display a heat map 82 for haul trucks 16 (not shown) traveling in the loaded payload state, as best seen in FIG. 6. As was the case for heat map 78 (for trucks traveling in the empty payload state) depicted in FIG. 5, heat map 82 may comprise various segments 84 overlain on road network 24 that provide a visual indication of the bunching conditions detected along various routes 34 of haul roads 22. Again, areas of significant bunching may be depicted in a color red, whereas areas with less severe or only occasional bunching may be depicted in a color yellow. Areas where little or no bunching was detected may be depicted in a color green. Mining operators or shift managers (not shown) may use such heat maps 78 and 80 to make additional determinations about the efficiency of the mining operation 12. For example, road segments that are persistently depicted in red may indicate the need to conduct road repairs or perhaps even reconfigure the haul road 22 (e.g., if an intersection 74 is involved) in order to reduce or eliminate vehicle bunching at such locations.

Processing system 42 also may be operatively connected to a director system 52. Director system 52 is responsive to information and data produced by the processing system 42 and may be used to apply one or more vehicle controls to one or more of the haul trucks 16 to reduce or eliminate the bunched condition. For example, director system 52 may adjust the speed or velocity of one or more haul trucks 16 based at least in part on the determination that the trucks 16 are operating in a bunched condition. In one embodiment, director system 52 may interface with a driver information module (not shown) associated with each haul truck 16 to instruct or command the driver to adjust the speed of the haul truck 16 to minimize or eliminate the bunched condition.

In some embodiments, director system 52 may also interface with a mine dispatch system 54. In such an embodiment, director system 52 may, via the mine dispatch system 54, direct (or re-direct) one or more of the haul trucks 16 to follow one or more alternative routes or pathways 34, i.e., sequence of haul road segments 26, in order to reduce or eliminate the bunched condition. See also FIG. 2. Director system 52, e.g., via the dispatch system 54, also may assign or re-assign a destination (e.g., a particular loading area 18 or dumping area 20) for one or more of the haul trucks 16 in order to minimize or eliminate the bunched condition.

Referring now to FIGS. 3 and 4, the various components of system 10, including processing system 42, may be configured or programmed to operate in accordance with a method 56 to determine whether two or more haul trucks 16 are traveling in the bunched condition. Method 56 may be performed for each defined locations location 38 on haul roads 22 and on a periodic basis, e.g., once every second. In addition addition, method 56 may be performed for haul trucks 16 traveling in the unloaded or empty payload state and in the loaded payload state.

A first step 58 of method 56 involves determining an intra-arrival time or 'IAT' for two consecutive haul trucks 16 traveling in the same direction along a haul road 22. The intra-arrival time or IAT is the difference in time for the two consecutive haul trucks 16, e.g., a leading truck 40 and a following truck 38, to cross or pass a given defined point or location 60 on haul road 22. See FIG. 4. In one embodiment, step 58 may involve an analysis of data contained in database 48 (FIG. 1) that relates to the location of the various haul trucks 16 on the haul roads 22. The data relating to the location of the various haul trucks 16 may be (or may be obtained from) location data provided by the position location systems (not shown) provided on the haul trucks 16. The location data may comprise GPS position data (e.g., latitude, longitude, and altitude). In addition, the GPS position data may include temporal data (e.g., a 'timestamp') associated with each particular position 'fix' obtained by the position location system.

In this regard it should be noted that in certain embodiments the data used by step 58 are not simply the "raw" or unprocessed location data provided position location systems, as such data often include erroneous data points and 'outliers' that bear no relation to the actual positions of the haul trucks 16 within mining operation 12. Accordingly, it is generally preferred, but not required, to first correlate the location data obtained from the position location systems on the haul trucks 16 with the locations of the actual haul roads 22 and/or other terrestrial features of the mine 12.

By way of example, in one embodiment, the location data obtained from the position location systems provided on the haul trucks 16 may be processed in accordance with the teachings described in U.S. Pat. No. 10,712,448, entitled "Real-Time Correlation of Sensed Position Data with Terrestrial Features," which is specifically incorporated herein by reference for all that it discloses. Alternatively, in another embodiment, the location data may be processed in accordance with the teachings described in U.S. Pat. No. 10,002, 109, entitled "Systems and Methods of Correlating Satellite Position Data with Terrestrial Features," which is also specifically incorporated herein by reference for all that it discloses.

Briefly, and with reference now primarily to FIG. 4, the systems and methods described in U.S. Pat. Nos. 10,712,448 and 10,002,109 correlate sensed location data (e.g., GPS data) with surveyed data associated with the various haul roads 22 defining mine road network 24. The surveyed data associated with each haul road 22 may include the locations of various unique snap points 76, which may be located along the approximate centerline of each haul road 22, although other arrangements are possible. Because the snap points 76 are accurately surveyed, they represent the true location of the actual haul roads 22 within mining environment 12. Therefore, correlating the location data obtained from the position location systems provided on the haul trucks 16 with the survey data (e.g., snap points 76) will result in a data set (e.g., a correlated data set) that will be reflective of the true positions of the haul trucks 16 on the various haul roads 22. The referenced patents describe systems and methods for so correlating or "snapping" the sensed location data (e.g., from the vehicle position location system) to the survey data which include snap points 76.

The systems and methods described in the referenced patents provide highly accurate and timely position data, typically within about 9 m (about 30 ft.) of the actual positions of the vehicles 14 (e.g., haul trucks 16) within the mine 12. The position data are also updated at high frequency, typically once every second.

In addition to the snapped position or location data, the data provided by the systems and methods described in the referenced patents also include temporal information or 'time stamp' data that identifies the time when each haul truck 16 passed over each snap point 76. The data also include data relating to the velocity or speed of the haul truck 16 at each particular snap point 76. In some embodiments, the velocity of speed data may have been produced by a speed sensor operatively associated with the haul truck 16 in the manner already described. Thus, the data associated with each snap point 76 may include not only the time stamp data, i.e., the time when the haul truck 16 passed over the snap point 76, but the velocity or speed of the haul truck 16 at that particular location or snap point 76 as well.

Continuing now with the description, the snapped position data produced by the methods and systems disclosed in the referenced patents may be used in step 58 to determine the IAT for consecutive haul trucks 16 traveling in the same direction on haul road 22. More specifically, step 58 determines a first time when the first or leading haul truck 40 passes over a defined location 60 and a second time when the second or following haul truck 38 passes over the same defined location 60. In some embodiments, the defined location 60 corresponds to a particular snap point 76, as best seen in FIG. 4. Step 58 then sets the IAT to be equal to the difference between the first and second times. For example, if the first or leading haul truck 40 passes over defined location 60 at a time of 14:10:00 (14 hours, 10 minutes, and 0 seconds), and the second or following haul truck 38 passes over the same defined location 60 at a time of 14:10:25 (14 hours, 10 minutes, and 25 seconds), then the IAT for that particular haul truck pair will be 25 seconds.

A next step 62 calculates a virtual spacing between the two consecutive haul trucks 16 traveling in the same direction on haul road 22. The virtual spacing is based on the IAT and a haul truck speed. The haul truck speed may be the velocity or speed of the first or leading haul truck 40 at the defined location 60, the velocity or speed of the second or following haul truck 38 at the defined location 60, or some combination thereof, such as the average of the two speeds. As mentioned above, the speeds of the haul trucks 16 at the relevant snap points 76 (e.g., defined location 60), may be obtained from the correlated data set stored in database 48 (FIG. 1). In some embodiments, the virtual spacing is the product of the IAT and the haul truck speed. For example, in an embodiment wherein the speed of the haul trucks is taken to be the average of the speeds of the leading and following trucks 40 and 38, and that average speed is 30 km/h (about 18.6 miles per hour), then the virtual spacing for that pair of haul trucks will be about 208 m (about 682 ft).

It should be noted that as used herein, "virtual spacing" does not refer to an actual or measured distance or spacing between the two consecutive vehicles 14 (e.g., leading haul truck 40 and following haul truck 38) at any particular moment in time. Rather, the virtual spacing refers to a calculated or virtual separation or spacing between the two vehicles 14 at different moments in time. Stated somewhat differently, the virtual spacing refers to a separation between the vehicles 14 when they pass a particular location in space, e.g., defined location 60, not as it might exist at a particular moment in time. Nevertheless, the virtual spacing is measured in units of length, not time.

Step 64 of method 56 determines a following distance threshold. In one embodiment, step 64 sets the following distance threshold to be equal to the greater of a safe following distance and a minimum following distance. The safe following distance is the distance required for a particular haul truck 16 to come to a complete stop at a given speed or velocity, road grade, and payload status. The minimum following distance may be the minimum distance that truck operators are trained to maintain between themselves the haul truck in front of them. Step 64 may be performed periodically (e.g., at least once every second) for each defined location 38 on haul road 22.

In one embodiment, step 64 may determine the safe following distance based on the velocity or speed of the second or following haul truck 38 when it passes over the defined location 60 (e.g., corresponding snap point 76). As mentioned earlier, the speed of the following haul truck 38 may be obtained from the correlated data set stored in database 48. The safe following distance may include a stopping distance component and a reaction component.

The stopping distance component of the safe following distance may be based on the velocity of the following haul truck 38 and the maximum deceleration associated with the following haul truck 38. Expressed mathematically, the stopping distance component, sdc, is given by:

$$sdc = v^2/2a \qquad (1)$$

where:
sdc is the stopping distance component of the safe following distance;
v is the velocity of the following haul truck 38; and
a is the maximum deceleration available for the following haul truck 38.

The maximum deceleration ('a' in equation 1) available for the following haul truck 38 may be based on the velocity of the following haul truck 38, the braking power of the following haul truck 38, the grade or slope (positive or negative) of the haul road 22 at the defined location 60, and the mass of the following truck 38. Expressed mathematically, the maximum deceleration, a, of the following haul truck 38 is given by:

$$a = (P/vm) - g\sin(\theta) \qquad (2)$$

where:
a is the maximum deceleration of the following truck 38;
P is the braking power of the following truck 38;
v is the velocity of the following truck 38;
m is the mass of the following truck 38; and
θ is the grade of the haul road 22.

In the particular embodiments shown and described herein, the braking power, P, may be set equal to twice the continuous retarding power for the following truck 38.

The reaction component of the safe following distance may be based on a determined reaction time and the velocity of the following haul truck 38 at the defined location 60. Expressed mathematically, the reaction component, rc, is given by:

$$rc = RT \cdot v \quad (3)$$

where:
RT is the typical human reaction time; and
v is the velocity of the following truck 38.

Combining equations (1) and (3), the safe following distance, s, may be expressed mathematically as:

$$s = v^2/2a + RT \cdot v \quad (4)$$

where:
s is the safe following distance;
$v^2/2a$ is the stopping distance component; and
$RT \cdot v$ is the reaction component.

The deceleration 'a' of the stopping distance component is given by equation (2).

As mentioned above, the minimum following distance is the minimum distance that truck operators (not shown) are trained to maintain between themselves and the haul truck 16 in front of them. In one embodiment, the minimum following distance is different depending on whether the haul road 22 is in a wet condition or a dry condition. A minimum following distance for a wet road condition is referred to herein as a wet condition minimum following distance, whereas the minimum following distance for a dry road condition is referred to herein as a dry condition minimum following distance.

Step 64 of method 56 may include a step of determining whether the haul road 22 is in a wet condition or in a dry condition. Step 64 may then set the minimum following distance to be equal to the wet condition minimum following distance when the haul road 22 is in the wet condition. If the haul road 22 is in the dry condition, then step 64 may set the minimum following distance to be equal to the dry condition minimum following distance. By way of example, in one embodiment, the wet condition minimum following distance may be about 91 m. (about 300 ft.), whereas the dry condition minimum following distance may be about 46 m. (about 150 ft.). Alternatively, other lengths may be used depending on the particular application, roadway type, vehicle type, etc., as would become apparent to persons having ordinary skill in the art after having become familiar with the teachings provided herein. Consequently, the present invention should not be regarded as limited to any particular wet or dry condition minimum following distances.

In some embodiments, the determination of whether the haul road 22 is in the wet condition or the dry condition may be obtained from information provided by a system operator (not shown) via user interface system 46. In other embodiments, the determination of whether the haul road 22 is in the wet or dry condition may be determined automatically (i.e., without requiring additional user intervention) based on data produced by an environmental sensor (not shown) located within the mining environment 12. Still other alternatives are possible, as would become apparent to persons having ordinary skill in the art after having become familiar with the teachings provided herein. Therefore, the present invention should not be regarded as limited to any particular way of determining whether the haul road 22 is in the wet or dry condition.

Step 66 includes comparing the virtual spacing (from step 62) and the following distance threshold (from step 64). Step 68 determines that the two consecutive vehicles 14 (i.e., leading haul truck 40 and following haul truck 38) are in the bunched condition when the virtual spacing is less than the following distance threshold. If the leading and following haul trucks 40 and 38 are in the bunched condition, method 56 then proceeds to step 70 and applies vehicle controls to either or both of the leading and following haul trucks 40 and 38 to reduce or eliminate the bunched condition. Such vehicle controls may involve adjusting the speed of at least one of the two consecutive vehicles (e.g., either the leading vehicle 40 or one or more of the following vehicles 38) until the vehicles 14 are no longer traveling in the bunched condition. Other control actions may include changing the routes 34 or assigned destinations, e.g., loading or dumping areas 18 and 20, of the vehicles 14. The control actions may be implemented via the director system 52.

In some embodiments, method 56 may also comprise step 72 in which the processing system 42 presents on display system 50 information and data relating to whether the vehicles 14, e.g., haul trucks 16 are in the bunched condition. For example, display system 50 may display or depict a heat map 78 for haul trucks 16 traveling in the empty or unloaded payload state, as best seen in FIG. 5. Display system 50 may also depict a heat map 80 for haul trucks traveling in the loaded payload state, as best seen in FIG. 6. The various heat maps 78 and 80 provide visual indications of the bunching conditions for empty and loaded haul trucks 16 detected along various routes 34 of haul roads 22.

Heat maps 78 and 80 may be used to make additional determinations about the efficiency of the mining operation 12. For example, it may be the case that the application of the vehicle controls is not successful in completely eliminating vehicle bunching. In such instances, the persistent vehicle bunching may be indicative of structural problems with the haul roads themselves. For example, road segments that are persistently depicted as involving significant bunching may indicate the need to conduct road repairs. Persistent bunching at certain locations, particularly at bends or sharp turns in the haul roads 22, may be indicative of the need to reconfigure the haul road 22 (e.g., by increasing the radius of curvature of the bend or by increasing the bank angle) in order to reduce persistent bunching. Similarly, persistent bunching at intersections may indicate the need to rework the haul road intersection to smooth traffic flow.

Unless defined otherwise, all technical and scientific terms used herein have the same meaning as commonly understood by persons having ordinary skill in the art to which the invention pertains. Although any methods and materials similar or equivalent to those described herein can be used in practice for testing of the present invention, the preferred materials and methods are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of operating vehicles traveling on a roadway, comprising:
    determining an intra arrival time for two consecutive vehicles traveling on the roadway, wherein said determining the intra arrival time comprises:
        determining a first time when a first vehicle of the two consecutive vehicles passes a defined location on the roadway;
        determining a second time when a second vehicle of the two consecutive vehicles passes the defined location on the roadway; and
        setting the intra arrival time to be equal to a difference between the first and second times;
    calculating a virtual spacing between the two consecutive vehicles based on the intra arrival time;
    determining a following distance threshold;
    comparing the virtual spacing between the two consecutive vehicles with the following distance threshold;
    determining that the two consecutive vehicles are in a bunched condition when the virtual spacing between the two consecutive vehicles is less than the following distance threshold; and
    applying at least one vehicle control to at least one of the two consecutive vehicles until the two consecutive vehicles are no longer in the bunched condition.

2. The method of claim 1, further comprising presenting data relating to whether the two consecutive vehicles are in the bunched condition in a user-discernable format.

3. The method of claim 1, wherein said using the intra arrival time to calculate the virtual spacing between the two vehicles comprises:
    determining a velocity of the first vehicle when the first vehicle passes the defined location on the roadway;
    determining a velocity of the second vehicle when the second vehicle passes the defined location on the roadway; and
    calculating the virtual spacing based on the product of the intra arrival time and at least one of the first and second velocities.

4. The method of claim 3, wherein calculating the virtual spacing is based on the product of the intra arrival time and an average of the first and second velocities.

5. The method of claim 1, wherein said determining the following distance threshold comprises:
    determining a safe following distance;
    determining a minimum following distance; and
    setting the following distance threshold to be equal to the greater of the safe following distance and the minimum following distance.

6. The method of claim 5, further comprising determining the following distance threshold at least once every second of time for the defined location on the roadway.

7. The method of claim 6, further comprising creating a plurality of defined locations on the roadway and wherein said determining the following distance threshold is performed at least once every second of time for each of the plurality of defined locations on the roadway.

8. The method of claim 5, wherein said determining the safe following distance comprises:
    determining a velocity of the second vehicle when the second vehicle passes over the defined location on the roadway;
    calculating a stopping distance for the second vehicle based on the determined velocity of the second vehicle, a maximum deceleration associated with the second vehicle, and a reaction distance; and
    setting the safe following distance to be equal to the stopping distance.

9. The method of claim 8, further comprising calculating the maximum deceleration of the second vehicle based on the determined velocity of the second vehicle, a braking power of the second vehicle, a grade of the roadway at the defined location on the roadway, and a mass of the second vehicle.

10. The method of claim 9, further comprising:
determining a reaction time; and
calculating the reaction distance based on the reaction time and the velocity of the second vehicle.

11. The method of claim 5, wherein said determining a minimum following distance further comprises:
determining whether the roadway is in a wet condition or a dry condition;
setting the minimum following distance to be equal to a wet condition minimum following distance when the roadway is in the wet condition; and
setting the minimum following distance to be equal to a dry condition minimum following distance when the roadway is in the dry condition.

12. The method of claim 1, further comprising:
determining whether each of the two consecutive vehicles is traveling in a loaded state or an unloaded state; and
performing said method when each of the two consecutive vehicles are traveling in the loaded state.

13. The method of claim 1, wherein said applying at least one vehicle control comprises adjusting a speed of at least one of the two consecutive vehicles.

14. The method of claim 1, wherein said applying at least one vehicle control comprises changing a route of at least one of the two consecutive vehicles.

15. The method of claim 1, wherein said applying at least one vehicle control comprises changing a destination of at least one of the two consecutive vehicles.

16. A computer-implemented method of operating a plurality of vehicles traveling on a roadway, comprising:
determining, using a computer, an intra arrival time for two consecutive vehicles traveling on the roadway, the intra arrival time being based on respective times when the two consecutive vehicles pass a defined location on the roadway;
calculating, with the computer, a virtual spacing between the two consecutive vehicles based on the intra arrival time;
determining, with the computer, a following distance threshold;
comparing, with the computer, the virtual spacing between the two consecutive vehicles with the following distance threshold;
determining, with the computer, that the two consecutive vehicles are in a bunched condition when the virtual spacing between the two consecutive vehicles is less than the following distance threshold; and
applying at least one vehicle control to at least one of the two consecutive vehicles until the two consecutive vehicles are no longer in the bunched condition.

17. The method of claim 16, further comprising presenting, using the computer, user-discernable data relating to whether the two consecutive vehicles are in the bunched condition.

18. The method of claim 16, wherein said applying at least one vehicle control further comprises adjusting a speed of at least one of the two consecutive vehicles until the vehicles are no longer in the bunched condition.

19. The method of claim 16, wherein said applying at least one vehicle control further comprises changing a route of at least one of the two consecutive vehicles.

20. The method of claim 16, wherein said applying at least one vehicle control further comprises changing a destination of at least one of the two consecutive vehicles.

21. The method of claim 16, wherein said using the intra arrival time to calculate the virtual spacing between the two consecutive vehicles comprises:
determining a velocity of the first vehicle when the first vehicle passes the defined location on the roadway;
determining a velocity of the second vehicle when the second vehicle passes the defined location on the roadway; and
calculating the virtual spacing based on the product of the intra arrival time and at least one of the first and second velocities.

22. The method of claim 16 wherein said determining the following distance threshold comprises:
determining a safe following distance;
determining a minimum following distance; and
setting the following distance threshold to be equal to the greater of the safe following distance and the minimum following distance.

23. The method of claim 22, wherein said determining the safe following distance comprises:
determining a velocity of the second vehicle when the second vehicle passes the defined location on the roadway;
calculating a stopping distance for the second vehicle based on the determined velocity of the second vehicle, a maximum deceleration associated with the second vehicle, and a reaction distance; and
setting the safe following distance to be equal to the stopping distance.

24. The method of claim 23, further comprising calculating the maximum deceleration of the second vehicle based on the determined velocity of the second vehicle, a braking power of the second vehicle, a grade of the roadway at the defined location on the roadway, and a mass of the second vehicle.

25. The method of claim 24, further comprising:
determining a reaction time; and
calculating the reaction distance based on the reaction time and the velocity of the second vehicle.

26. The method of claim 22, wherein said determining a minimum following distance further comprises:
determining whether the roadway is in a wet condition or a dry condition;
setting the minimum following distance to be equal to a wet condition minimum following distance when the roadway is in the wet condition; and
setting the minimum following distance to be equal to a dry condition minimum following distance when the roadway is in the dry condition.

27. A non-transitory computer-readable storage medium having computer-executable instructions embodied thereon that, when executed by at least one computer processor cause the computer processor to:
determine an intra arrival time for two consecutive vehicles traveling on a roadway by:
determining a first time when a first vehicle of the two consecutive vehicles passes a defined location on the roadway;
determining a second time when a second vehicle of the two consecutive vehicles passes the defined location on the roadway; and
setting the intra arrival time to be equal to a difference between the first and second times;
calculate a virtual spacing between the two consecutive vehicles based on the intra arrival time;
determine a following distance threshold;

compare the virtual spacing between the two consecutive vehicles with the following distance threshold;

determine that the two consecutive vehicles are in a bunched condition when the virtual spacing between the two consecutive vehicles is less than the following distance threshold; and apply at least one vehicle control to at least one of the two consecutive vehicles until the two consecutive vehicles are no longer in the bunched condition.

28. A system for operating vehicles traveling on a roadway, comprising:

a display system;

a database; and a processing system operatively associated with said display system and said database, said processing system being configured to:

determine an intra arrival time for two consecutive vehicles traveling on the roadway by:

determining a first time when a first vehicle of the two consecutive vehicles passes a defined location on the roadway;

determining a second time when a second vehicle of the two consecutive vehicles passes the defined location on the roadway; and setting the intra arrival time to be equal to a difference between the first and second times;

calculate a virtual spacing between the two consecutive vehicles based on the intra arrival time;

determine a following distance threshold;

compare the virtual spacing between the two consecutive vehicles with the following distance threshold; and determine that the two consecutive vehicles are in a bunched condition when the virtual spacing between the two consecutive vehicles is less than the following distance threshold; and a director system operatively connected to said processing system, said director system applying at least one vehicle control to at least one of the two consecutive vehicles until the two consecutive vehicles are no longer in the bunched condition.

29. The system of claim 28, wherein said processing system is further configured to present on said display system user-discernable data relating to whether the two consecutive vehicles are in the bunched condition.

30. The system of claim 28, wherein the at least one vehicle control applied by said director system adjusts the speed of one or more of the plurality of vehicles.

31. The system of claim 28, wherein the at least one vehicle control applied by said director system changes a route of one or more of the plurality of vehicles.

32. The system of claim 28, wherein the at least one vehicle control applied by said director system changes a destination of one or more of the plurality of vehicles.

\* \* \* \* \*